US012155577B2

(12) United States Patent
Fugitt et al.

(10) Patent No.: US 12,155,577 B2
(45) Date of Patent: Nov. 26, 2024

(54) MESSAGE BROKER SYSTEM WITH PARALLEL PERSISTENCE

(71) Applicant: Informatica LLC, Redwood City, CA (US)

(72) Inventors: Jesse A. Fugitt, Oswego, IL (US); Turkmen Canli, Oak Park, IL (US); Sahir Hoda, Naperville, IL (US)

(73) Assignee: Informatica LLC, Redwood City, CA (US)

( * ) Notice: Subject to any disclaimer, the term of this patent is extended or adjusted under 35 U.S.C. 154(b) by 85 days.

(21) Appl. No.: 17/129,070

(22) Filed: Dec. 21, 2020

(65) Prior Publication Data

US 2021/0112013 A1 Apr. 15, 2021

Related U.S. Application Data

(62) Division of application No. 14/954,731, filed on Nov. 30, 2015, now Pat. No. 10,904,155.

(60) Provisional application No. 62/086,111, filed on Dec. 1, 2014.

(51) Int. Cl.
H04L 47/34 (2022.01)
G06Q 40/04 (2012.01)
H04L 12/18 (2006.01)
H04L 41/00 (2022.01)
H04L 41/0668 (2022.01)
H04L 45/02 (2022.01)
H04L 47/78 (2022.01)
H04L 51/00 (2022.01)

(52) U.S. Cl.
CPC .............. *H04L 47/34* (2013.01); *G06Q 40/04* (2013.01); *H04L 12/1895* (2013.01); *H04L 41/0668* (2013.01); *H04L 41/30* (2013.01); *H04L 45/04* (2013.01); *H04L 47/782* (2013.01); *H04L 51/00* (2013.01)

(58) Field of Classification Search
CPC . H04L 47/34; H04L 12/1895; H04L 41/0668; H04L 41/30; H04L 45/04; H04L 47/782; H04L 51/00; G06Q 40/04
See application file for complete search history.

(56) References Cited

U.S. PATENT DOCUMENTS

| 5,481,694 | A  | * | 1/1996  | Chao    | G06F 11/1451 |
|           |    |   |         |         | 714/E11.13   |
| 6,820,098 | B1 | * | 11/2004 | Ganesh  | G06F 11/2082 |
|           |    |   |         |         | 714/E11.107  |
| 8,843,441 | B1 | * | 9/2014  | Rath    | G06F 16/182  |
|           |    |   |         |         | 707/614      |
| 2002/0161889 | A1 | * | 10/2002 | Gamache | G06F 11/2023 |
|           |    |   |         |         | 709/226      |
| 2005/0165858 | A1 | * | 7/2005  | Tom     | G06F 16/27   |
| 2008/0288646 | A1 | * | 11/2008 | Hasha   | G06F 16/1844 |
|           |    |   |         |         | 709/251      |
| 2010/0103781 | A1 | * | 4/2010  | Rai     | G06F 1/12    |
|           |    |   |         |         | 368/55       |

(Continued)

Primary Examiner — Kamal B Divecha
Assistant Examiner — Eui H Kim
(74) Attorney, Agent, or Firm — Amardeep S. Grewal; Paul J. McDonnell; Reed Smith LLP

(57) ABSTRACT

A method and messaging system comprising a master broker computer system, a plurality of slave broker computer systems, and a plurality of event stores, for a broker computer system to change its status from a slave broker computer system to a master broker computer system.

21 Claims, 11 Drawing Sheets

(56) References Cited

U.S. PATENT DOCUMENTS

2010/0114824 A1\* 5/2010 Krishnaprasad .... G06F 11/2094
707/637
2014/0359229 A1\* 12/2014 Cota-Robles ....... G06F 9/45558
711/143

\* cited by examiner

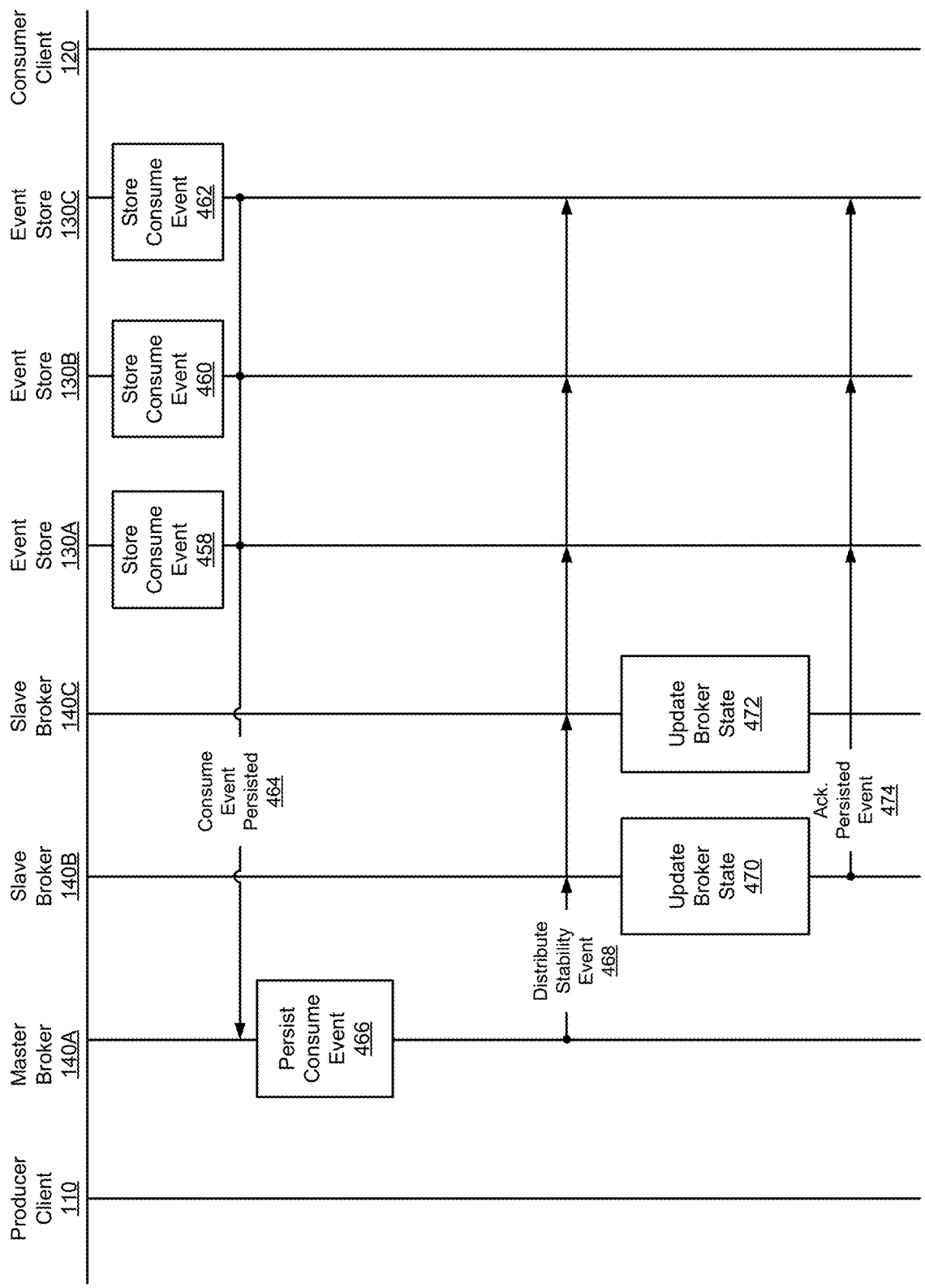

MESSAGE BROKER SYSTEM WITH PARALLEL PERSISTENCE

CROSS REFERENCE TO RELATED APPLICATIONS

This application is a divisional application of U.S. Nonprovisional application Ser. No. 14/954,731, filed Nov. 30, 2015, which itself claims the benefit of U.S. Provisional Application No. 62/086,111, filed Dec. 1, 2014, the disclosures of which are hereby incorporated by reference in their entirety.

BACKGROUND

1. Technical Field

The subject matter described herein relates generally to message broker computer systems, and in particular, a master/slave message broker computer system with parallel persistence.

2. Background Information

Message speed and reliability are crucial performance requirements for messaging applications. For example, financial markets compete on speed, and high-speed trading capabilities have become a performance differentiator for the largest financial services firms and some investment funds. There is a demand for an efficient, high-throughput, low-latency and more secure method of linking their worldwide operations. Current solutions generally utilize a master/slave broker architecture that requires a shared database/file system. The shared database/file system, however, is far from ideal as it becomes a single point of failure such that if the shared database/file system fails the entire system goes down—and data (e.g., brokerage orders) may be potentially be lost.

BRIEF DESCRIPTION OF THE DRAWINGS

FIG. 4A-C is an interaction diagram of a method of using a message broker system to process a message, according to one embodiment.

DETAILED DESCRIPTION

Figure 1:
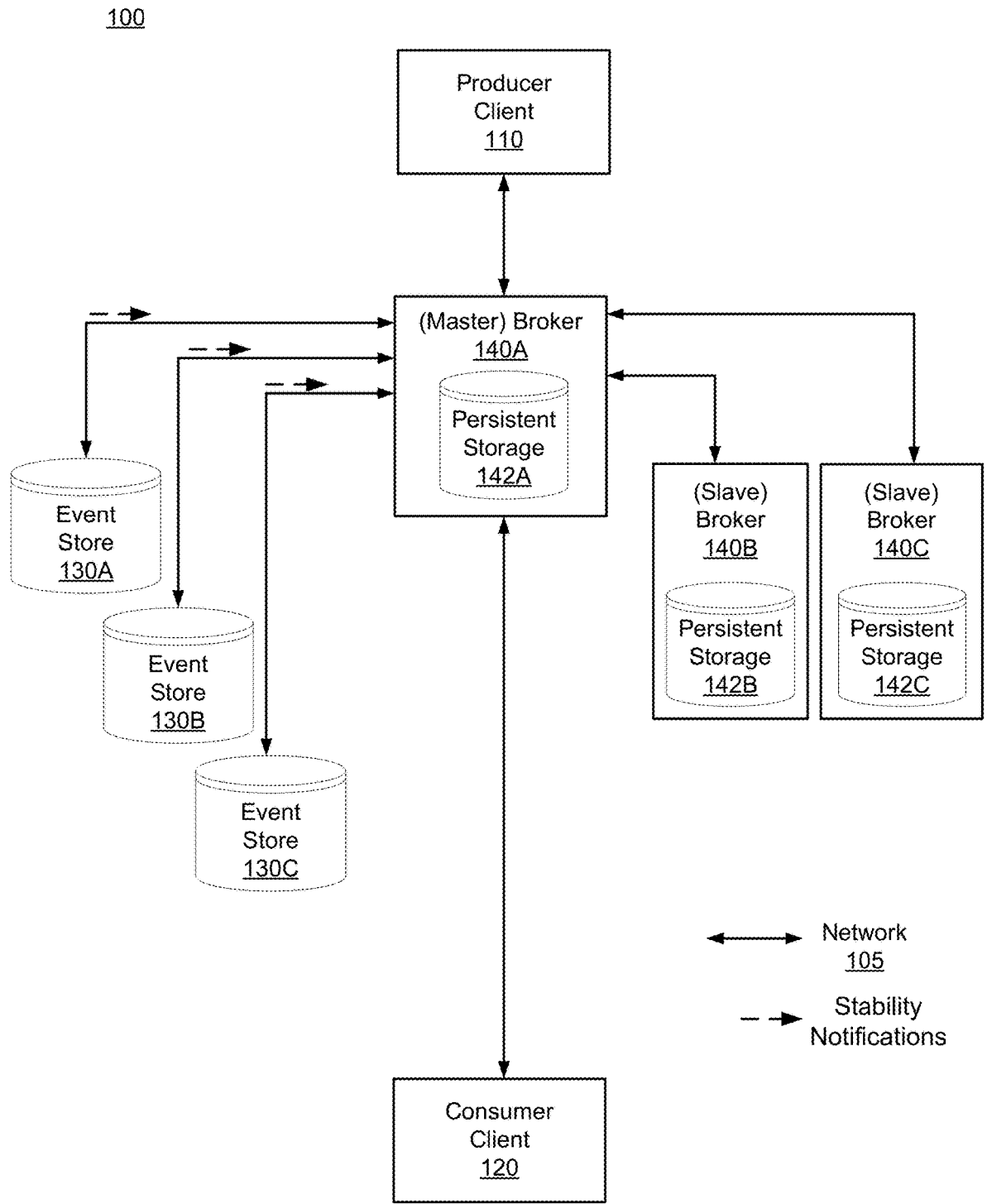
FIG. 1 is a high-level block diagram illustrating a networked computing environment suitable for implementing a message broker system, according to one embodiment.

A message broker computer system configured as a master/slave message broker computer system using a shared-nothing architecture provides low latency messaging in combination with high reliability. The message broker computer system includes at least three brokers, one of which is configured as a master broker and the other brokers configured as slave brokers. The message broker system includes a plurality of event stores. Client producer computer systems send messages for processing to the master broker. The master broker generates a message event in response to receiving such a message, and distributes the message event in parallel to the slave brokers and the event stores. Each of the event stores store the message event in persistent storage, and notifies the master broker that the message event has been persisted. Because the message event is persisted on a quorum of the event stores the master broker considers the message stabilized, the master need not obtain confirmation from the slave brokers. A quorum of event stores is at least two event stores. In some embodiments, a quorum may be the majority of the event stores. After a slave broker persists a messaging event it separately notifies the event stores. As the master broker does not take action until a messaging event is stabilized, in the event of failover, a new master broker is able to re-construct a broker state of the old master with no loss of data.

In the event of failover (e.g., the master broker terminates operation or is taken down for service), the slave brokers are configured to elect a new master broker from the pool of slave brokers. The newly elected master broker is able to recover any stabilized message event from the event stores. The newly elected master broker retrieves message events from the event stores that it has no record of, and identifies a maximum contiguous message event (MCM) using the message event stream. Based on the MCM, the new master broker identifies a synchronization point using the MCM, the synchronization point being a sequence number pointed to by a back pointer in metadata associated with the MCM. The new master broker then republishes any message events with sequence numbers above that of the synchronization point, and updates the broker state in the message broker to correspond to the MCM. As different slave brokers receive message events at different times, slave brokers may have different broker states (ideally they would be the same—and reflect the broker state of the master broker). The republished message events include metadata that indicates there is a new master broker. The slave brokers are configured to drop message events from the old master broker with synchronization numbers later than the synchronization point. Accordingly, the new master broker is able to completely recover a broker state of the old master broker prior to failure in a manner that results in no loss of stabilized data.

The Figures (FIGS.) and the following description describe certain embodiments in which the message broker system is applied to a computer network by way of illustration only. One of skill in the art will recognize from the following description that the message broker system can be applied to other computer based representations of interrelated elements, and that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

FIG. 1 is a block diagram illustrating an embodiment of an environment for facilitating a message brokering computer system 100. The environment includes a producer client 110, a consumer client 120, event stores 130A, 130B, and 130C, and slave brokers 140B, and 140C, each coupled by a network 110 to a master broker 140A. Here, only one producer client 110 and consumer client 120, are illustrated, but in practice there will numerous instances of each of these entities, typically thousands or more, requiring a high speed and reliable mechanism for delivery of messages between them. Moreover, while only two slave brokers and three event stores are illustrated, some embodiments include additional slave brokers and/or event stores. As appreciated and understood by those of skill in the art, the system and methods and methods described herein are inherently and necessarily performed using a physical, tangible computer system operating on electrical coded signals; in no event can the methods and operations described herein be performed by a human being (or group of human beings) or by mental steps. Thus, the terms "master broker," "slave broker," "message broker," "clients," and "message store" are to be understood as referring to physical computer systems, not human beings or mental processes.

The network 105 provides a communication infrastructure between the producer client 110, the consumer client 120, the event stores 130A, 130B, and 130C, the slave brokers 140B and 140C, the master broker 140A. The network 105 is typically the Internet, but may be any network, including but not limited to a Local Area Network (LAN), a Metropolitan Area Network (MAN), a Wide Area Network (WAN), a mobile wired or wireless network, a private network, or a virtual private network.

The producer clients 110 are computing devices that execute computer program modules—e.g., client applications—which communicate messages to the master broker 140A. A message is digital data. Messages may be, e.g., brokerage orders, bank transactions, temperature readings, some other data that may be replicated and persisted by the message brokering system 100, or some combination thereof. The Producer clients 110 may be, e.g., a custom application running on a desktop computer coupled to the master broker 140A that is running on an enterprise grade server. In other embodiments, a producer client 110 is a webserver of an enterprise that generates messages in response to instructions received from users accessing the webserver using a browser application on a personal computer, smart phone, etc. In some embodiments the producer clients 110 may be an ultra-messaging queuing application and/or a JAVA messaging service application. The producer clients 110 provide the message (e.g., a sell order for stock) to the master broker 140A. In some embodiments, the producer clients 110 may communicate with the master broker 140A using Advanced Message Queuing Protocol (AMQP) and/or OPENWIRE protocol available from The Apache Software Foundation™.

The consumer clients 120 are computing devices that execute computer program modules—e.g., client applications—which communicate messages to the master broker 140A. In some embodiments, a consumer client 120 is a backend server in an enterprise that is processing the messages that it receives from the master broker 140A. In some embodiments, a consumer client 120 may be associated with a regulator or a computing device that sends the message to the regulator. In some embodiments the consumer clients 120 may be an ultra-messaging receiver application and/or a JAVA consumer application. In some embodiments, the consumer clients 120 may communicate with the master broker 140A using AMQP and/or OPENWIRE protocol. As configured for interoperation with a master broker computer system, for example with the AMQP or OPENWIRE protocols, the operations and functions of the clients 110, 120 extend beyond the basic, generic functions of a generic computer system, The event stores 130A, 130B, 130C are data stores that each comprise one or more non-transitory computer-readable media and are configured to store message events received from the master broker 140A. Once an event store 130A, 130B, 130C has stored (also referred to as persisted) a message event, the event store 130A, 130B, 130C notifies the master broker 140A that the message event was successfully persisted using a stability notification.

In embodiments, where a broker is transitioning from slave broker to a master broker, the event stores 130A, 130B, 130C also provide synchronization information to newly elected master broker. The synchronization information includes sequence information for the message, including the highest sequence numbers of message events which has been persisted on each of the plurality of event stores 130A, 130B, 130C. The event stores 130A, 130B, 130C also may provide one or more stored message events to the newly elected master broker.

The brokers 140A, 140B, 140C, include one master broker and the remaining brokers are slave brokers. In this example, broker 140A is the master broker, and brokers 140B and 140C are slave brokers. However, any broker has the capability of acting as a master broker or a slave broker. Moreover, in the event that the master broker 140A fails, one of the remaining slave brokers 140B, 140C is selected by the slave brokers as the new master broker. The master election process is further described in detail with respect to FIG. 4 below. As configured by the operations and functions described herein, the brokers 140 provide features and functions that extend beyond the basic generic functions of a generic computer system. For example, conventional generic computer systems do not provide as part of their instruction sets, operating system software, utility software, or other applications, functions for the election of a new master broker from plural slave brokers in the event of a failover of an existing master broker.

Broker 140A, 140B, and 140C each include a persistent storage 142A, 142B, and 142C, respectively. The persistent storages 142A, 142 B, 142C comprises one or more non-transitory computer-readable media and is configured to store message events. The data stored by the persistent storage 142A, 142 B, 142C includes information describing a broker state of the associated broker 140. For example, the persistent storage 142 would include information describing the broker state of the master broker 140A, the persistent storage 142B would include information describing the broker state of slave broker 142B, and so on. The broker state is a representation of the message event stream that is has been persisted at that broker—and in effect describes the net state for each message event.

As indicated above, the master broker 140A generates message events. A message event may be one of many different types (e.g., enqueue, assign, consume, transaction events, administration events such as create or delete a destination queue, etc.). The master broker 140A may generate a message event in response to receiving a message from a client producer 110, a consumer producer 120, stabilization notifications from at least two of the event stores 130A, 130B, 130C for a particular message event, etc. The master broker 140A distributes generated message events to the slave brokers 140B, 140C and the event stores 130A, 130B, 130C.

A message event (may also be referred to as a replication event) is the message received from the producer client 110 along with additional metadata which is added by the master broker 140A. The metadata includes the following data fields: last stable sequence number, last stable epoch, and sequence number. The epoch and sequence number fields represent the unique message event identifier. The epoch is incremented each time a new master broker is elected and the sequence number is incremented each time a new message event is published by that master (and resets to 0 when changing epochs). The "last stable" field indicates the last stable message event known to the master broker at the time it was sending the "new" message event. For example, assume that message event at (epoch 0 sequence, number 17) is an enqueue message event being published by the master broker 140A to indicate a producer client 110 is attempting to add a persistent message to a queue in the broker. Immediately after being distributing this message event to event stores 130A, 130B, 130C, and the slave brokers 140B, 140C, the master broker 140A does not have any information indicating if this message event is stable anywhere. However, once event stores 130A, 130B, 130C send stability notifications back to the master broker 140A, the broker 140A stores information indicating this the message event at (epoch 0, sequence number 17) is stable (on disk) at the one or more of event stores 130A, 130B, 130C. When it publishes its next message event (epoch 0 sequence number 18), the master broker 140A will set the last stable epoch and last stable sequence number to 0 and 17, respectively in this next message event, to indicate that the previous events up to (and including) epoch 0 sequence number 17 are now stable.

The master broker 140A is the only entity in the messaging system that is configured to process the metadata of the message events and selectively act in response to such metadata. This simplifies and reduces that number of states that can occur in messaging systems where each entity is configured with processing logic to selectively act upon the message metadata. In one embodiment, every determination by the master broker 140A is made by waiting for at least two different event stores 130A, 130B or 130C to indicate that an event has been stabilized. Once at least two different message stores 130A, 130B or 130C have indicated that the message event is stabilized, the master broker 140A is configured to take external action on the message event and update its broker state in persistent storage 142A. In addition, the master broker 140A distributes to the slave brokers 140B, 140C, and the event stores 130A, 130B, 130C information describing the last messaging event that it has determined to be stabilized by periodically sending out a stability event that identifies the sequence number and the epoch number of the last messaging event which has been stabilized. In states of constant activity, the master broker 140A does not need to send out the periodic stability event because it will include this information as part of each outgoing message event. Accordingly slave brokers 140B, 140C can safely apply message events being held in memory to their disk persistence layer (i.e., persistent storage), and slave brokers may utilize this information to identify a clean cutover point when becoming a master during the failover process.

The master broker 140A and the slave brokers 140B, 140C, each maintain a broker state. As discussed above, the broker state is a representation of the message event stream that is has been persisted at that broker—and in effect describes the net state for each message event. For example for a particular message, an enqueue message event, followed by an assign message event, followed by a consume message event might result in a broker state that was totally empty for that message. In contrast, for a second message, only an enqueue message event may have been generated such that the broker state shows an enqueue event being the current state associated with the second message.

Figure 2:
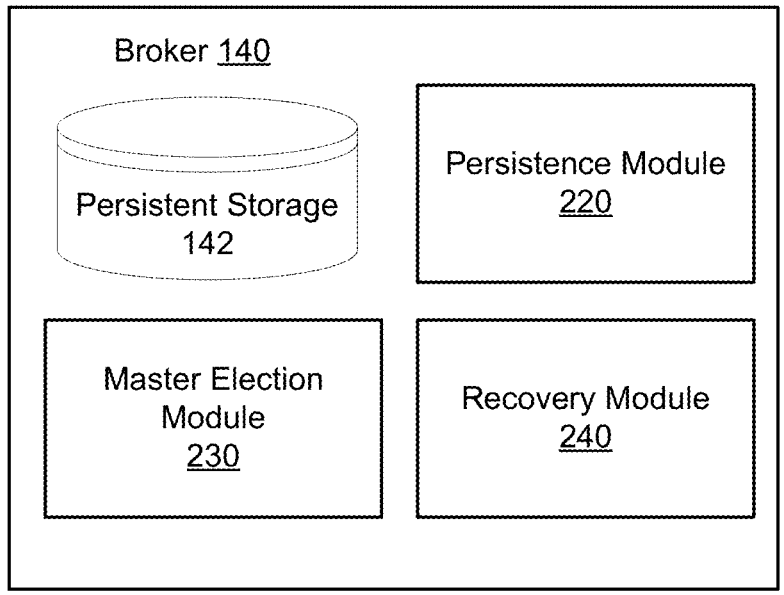
FIG. 2 is a high-level block diagram illustrating a detailed view of modules within a broker according to one embodiment.

FIG. 2 is a high-level block diagram illustrating a detailed view of modules within brokers 140A, 140B, and 140C (referred to in this section as broker 140) depicted in FIG. 1. Some embodiments of the broker 140 have different modules than those described here. Similarly, the functions can be distributed among the modules in a different manner than is described here. The broker 140 is comprised of modules including persistent storage 142, persistence module 220, master-election module 230, and recovery module 240.

The persistent storage 142 comprises one or more non-transitory computer-readable media and is configured to store data used by the broker 140 in persisting message events. The data stored by the persistent storage 142 includes information describing the broker state. Additional functions of the persistent storage 142 include storing messaging events based on a broker state, periodically rolling up a stream of messaging events into a state that represents the snapshot at that time and then storing the snapshot to the persistent storage, retrieving a snapshot of a messaging event before applying a new messaging event, applying replication events from a snapshot or the events stored in memory and other such functions.

The persistence module 220 controls operation of the broker 140 during operation either as a master broker 140A or a slave broker 140B or 140C. In one embodiment, the persistence module 220 can perform functions for a master broker. The functions for a master broker include generating transaction events such as add, assign or consume a message event or adding or deleting a destination event. As the message events are generated, the master broker persistence module 220 sends a replication event message to the slave brokers and the event stores in parallel. Once the replication event messages are sent out, the persistence module 220 waits for a stability notification from the event stores. A stability notification is an assurance from a slave broker or an event store that the message event has been persisted in their storage. On receiving stability notifications from a quorum, i.e. a predefined number of event stores (e.g. 2 event stores), the persistence module 220 determines that the message event has been persisted and communicates the same to a producer client 110 of the message event. The number that makes the quorum is configurable, i.e. it can be set to 3, 4, or any other number of event stores.

For every message event that the persistence module 220 of a master broker generates, it applies information associated with the previously stabilized message event to the metadata of the message event. Additionally, the persistence module 220 of a master broker periodically generates stability message events that include information associated with the last stable message event.

The persistence module 220 further sends the message event to the consumer client 120 and waits for an acknowledgement from the consumer client 120 that it has consumed the message. The persistence module 220 then generates remove message event that it distributes to the slave brokers and the event stores. On receiving the stability notifications for the remove message events, the persistence module 220 of the master broker removes the message event from the internal memory of the master broker 140A.

In one embodiment, the persistence module 220 can perform functions for the slave broker. On receiving the message event from a master broker, the persistence module 220 of the slave broker 140B or 140C holds it in the internal memory. The received message event includes metadata that contains information associated with the last stable event known to the master broker. The persistence module 220 extracts the information included in the metadata to retrieve a back pointer that points to the last stable message event number. The persistence module 220 of the slave broker applies the back pointer along with the current message event, also known as a snapshot of the current message event stream, to the persistent storage 142.

In case a slave broker is broken or has to be restarted, the slave broker can be ahead or behind the other brokers and thus have an inconsistent state. The persistence module 220 of the slave broker helps in achieving consistency of the broker state when the slave broker comes back up again via the replication stream protocol. For example, in case a slave broker received only a part of a replication message event before any other broker or event store, the message event is not applied before receiving the additional information related to the snapshot of the message from the master broker. If the slave broker goes down for a small period of time, the message event stream at the slave broker is almost in sync with the replication message event stream distributed by the master broker. The persistence module 220 can recover the lost message events from one of the event stores, leading to the slave broker being consistent with the ongoing replication message event stream. In case the slave broker is down for a long period of time, the slave broker falls far behind the current replication message event stream, a recovery module 240 is used to recover the state of the slave by a slave onboarding process.

The recovery module 240 can recover the broker state of the prior master broker in the event of failover of the master broker or recover the broker state of a slave broker in the event of a failover or restart of a slave broker. In a failover event of a master broker, a master election module 230, described in detail below, elects one of the slave brokers as the new master. Once a new master broker is elected, the recovery module 240 assists in transitioning the slave broker state to the prior master's broker state. The recovery module 240 determines a replication stream cutover point, i.e. a sequence number from a replication stream that defines the last event that the master broker marked as stable, i.e. the master broker received a quorum of stability notifications for the determined message event in the replication stream.

Since the master broker has failed, the master broker either needs to be restarted or repaired. This makes retrieving the last stable message event from the master broker not convenient and time consuming. Based on the replication stream protocol, the master broker generates information associated with the last stable message event with each message event. The message events may be in flight when the master broker fails. Based on the message events in flight, an embodiment is described below to determine the last stable message event.

Figure 3:
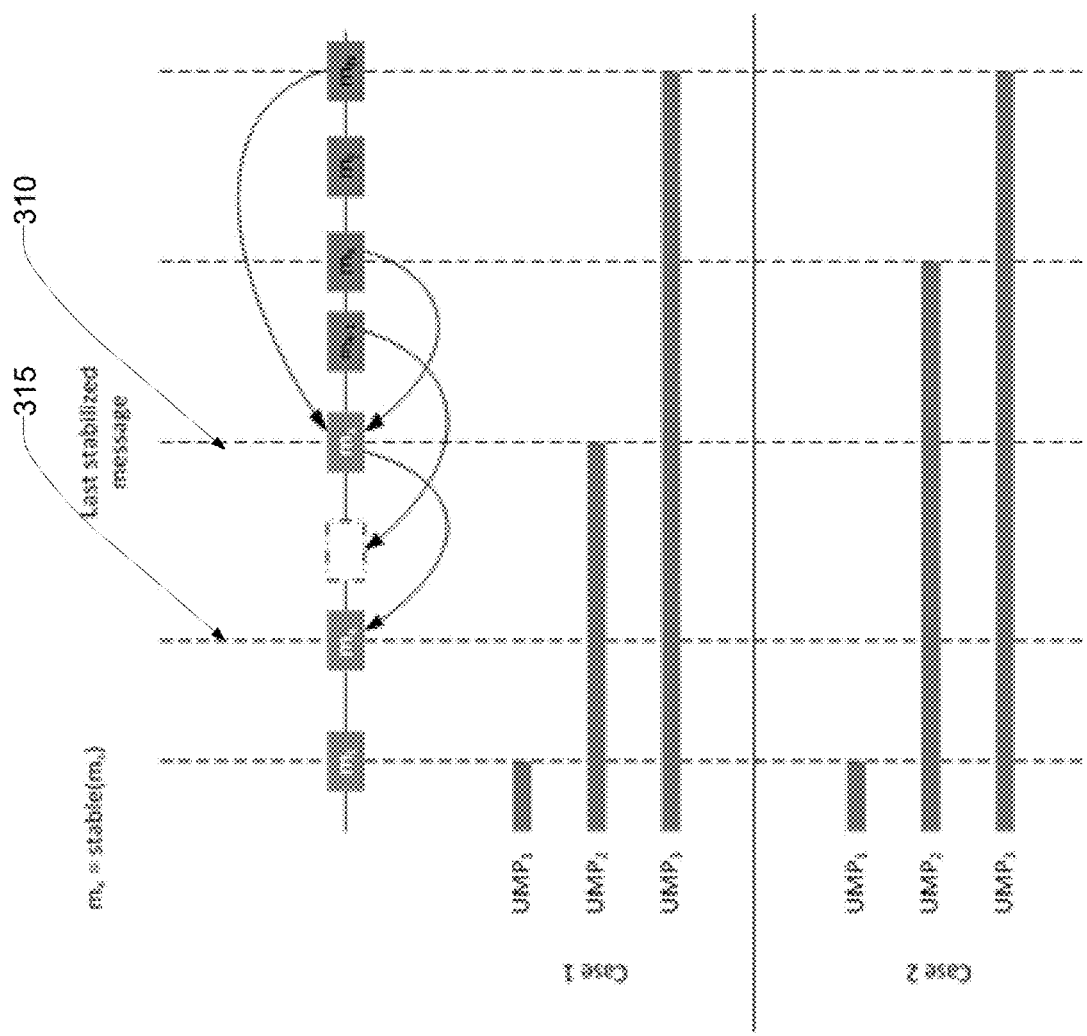
FIG. 3 is a time chart illustrating uncertainty in determining a last stable message event in case of a failed master broker, according to one embodiment.

FIG. 3 is a time chart illustrating uncertainty in determining a last stable message event in case of a failed master broker, according to one embodiment. In the case 1 of the example embodiment of FIG. 3, the event store $UMP_3$ is the only event store that has all the messages in flight. If the master broker and the event store $UMP_3$ fail at the same time, there is no way to determine that $m_s$ is the last stable message 310. In the case above, the last good point 315 is mx.

In the case 2 of the example embodiment, the event store $UMP_2$ has some messages that are in flight, the last message it has, message $m_k$, points back to last stable message 310 $m_s$. The event store $UMP_3$ has all the messages in flight. If the master broker and the event store $UMP_3$ fail at the same time, message $m_k$ is the latest available message amongst the event stores UMP daemons, and it points back to the last stable message $m_s$. The statuses of the messages $[m_{s+1}, m_k]$ will not be known. The last good point is $m_s$.

From the above example embodiments, it is noted that there is uncertainty in determining the last stable message. The message events after the known good point may or may not be stabilized. To overcome the uncertainty of the status of the message events, if there are gaps, i.e. none of the event stores have a particular message event, the range of message events that may or may not be stabilized after the known good point, is from the next message event of the known good point up to the last message before the gap.

Thus, for recovering the message event stream, a maximum contiguous message (MCM) is observed, i.e. a highest sequence numbered message that is observed before encountering a sequence number gap. A synchronization point is further determined as the back pointer of the MCM. The synchronization point is the stream cutover point. The new master will republish all the message events from the synchronization point up to the MCM, with a new epoch number determined for the elected master broker. Further, the new master will update its snapshot on the persistence storage up to the MCM, and reconstruct its broker memory state to be consistent with the MCM. Once the broker state is recovered, the master broker can start generating message events and resume role of a master.

In another embodiment, the recovery module 240 recovers the broker state of a slave broker in the event of a failover or restart of a slave broker. A broken slave broker is treated like a new slave broker that has no persistence or broker state. A disk snapshot from an existing slave broker that is not broken is copied over to the new or broken slave broker. The new broker that has no state will receive the live stream and will temporarily suspend the periodic updates to its disk snapshot. The existing broker will continue receiving the replication stream and will also temporarily suspend the periodic updates to its disk snapshot. The existing broker will then attempt to send the entire disk snapshot to the new broker. If the transmission succeeds, both slaves will have the same disk snapshot and both will begin applying their "buffered" events from memory to the disk snapshot and will eventually both be caught up to the live stream.

The master election module 230 determines that failover occurs and elects one of the slave brokers 140B, 140C as the new master broker. In some embodiments, the master broker sends a heartbeat signal to the master election module 230 at periodic intervals, for example, a heartbeat is sent every microsecond. The periodic interval is predefined and is configurable. The master election module 230 detects a failure of a master broker via lack of the heartbeat signal for a predefined timeout interval, for example, if no signal is received for a second.

The master election module 230 further keeps track a list of eligible slave brokers that can be elected as master brokers. On detection of a broken master, the master election module 230 elects a new master from the tracked list of eligible brokers. In some embodiments, the master election module 230 utilizes the RAFT protocol to elect the new master from the tracked list. In the time that the master election module 230 elects a new master, a temporary broker state is created by the recovery module 240 that can help the slave brokers to recover the failed master broker's message events, and recover the broker state of the failed master broker to apply it to the newly elected master broker.

Figure 4A:
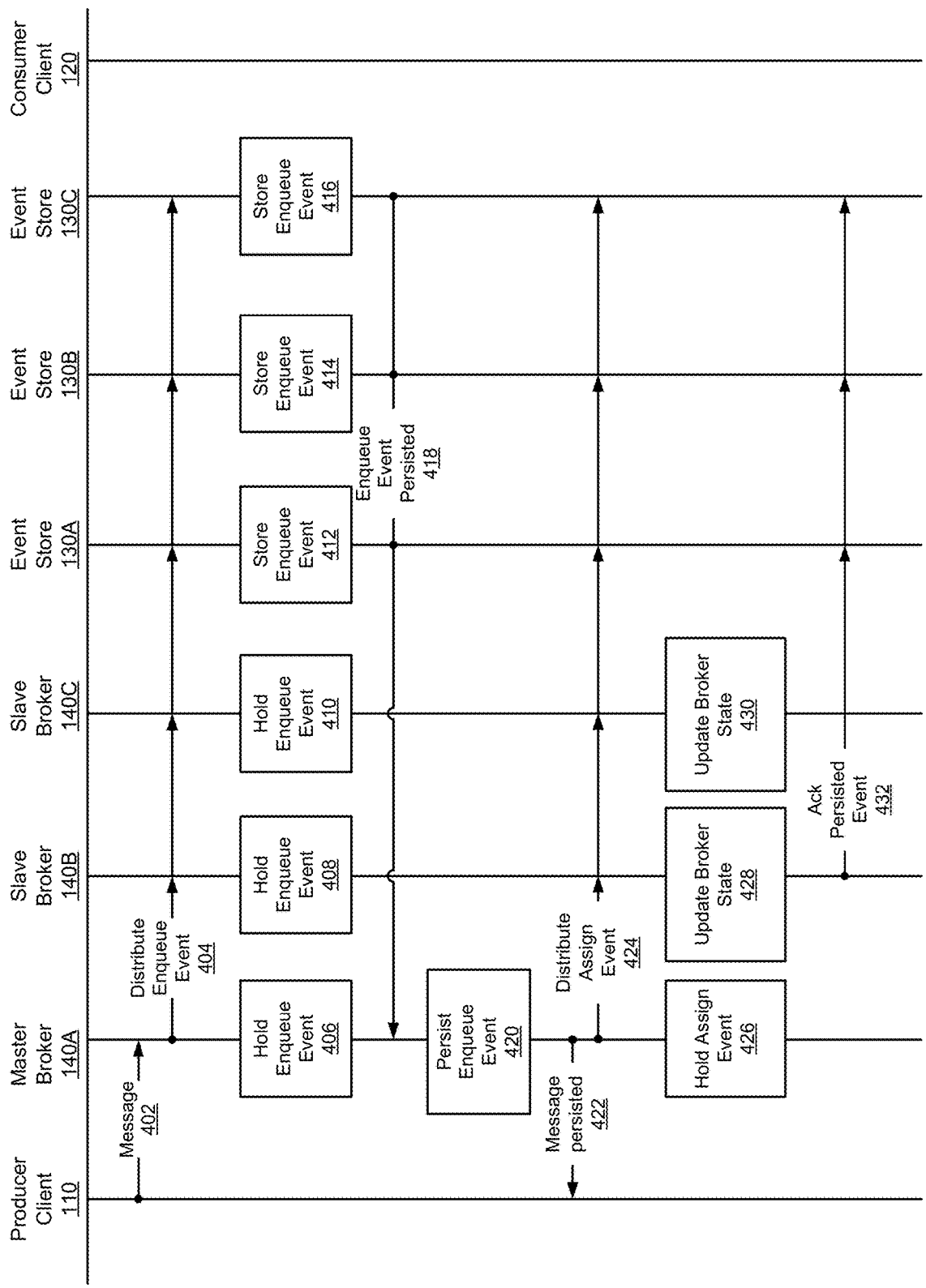
Figure 4B:
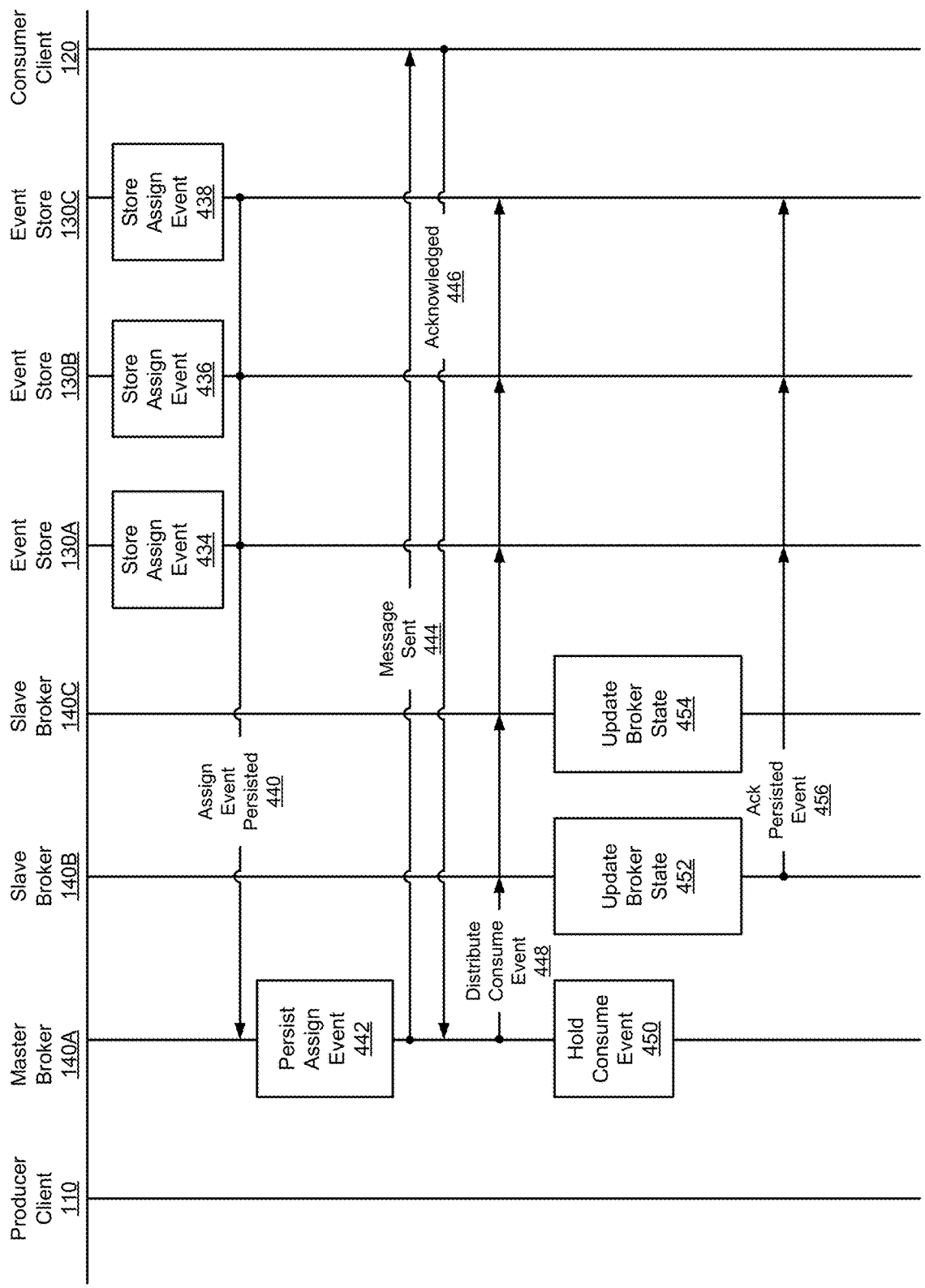

FIG. 4A-C is an interaction diagram of a method of using a message broker system to process a message, according to one embodiment. In various embodiments, the method may include different and/or additional steps than those described in conjunction with FIG. 4A-C. Additionally, in some embodiments, the steps may be performed in a different order than described in conjunction with FIG. 4A-C.

The producer client 110 sends a message 402 to the master broker 140A. The master broker 140A generates an enqueue event based on the received message. The generated enqueue event includes metadata including a sequence number of the last stable message event, an epoch number associated with the master broker 140A who sent the last stable message event, a sequence number for the enqueue event (e.g., sequence number 1), and an epoch number associated with the master broker 140A. The master broker 140A distributes 404 the enqueue event in parallel to the slave brokers 140B, 140C, and the messaging sources 130A, 130B, and 130C. In some embodiments, the distribution of the enqueue event may be done in a serial manner, or some combination of parallel and serial distribution.

The master broker 140A holds 406 the enqueue event in memory. Similarly, once the slave brokers 140B, 140C receive the distributed enqueue event, they also hold 408, 410, the enqueue event in memory.

The event stores 130A, 130B, 130C receive the enqueue event, and store 412, 414, 416 the enqueue event in their respective permanent memories. Once an event store stores the enqueue event in permanent memory it sends notification 418 to the master broker 140A that the enqueue event has been persisted. Thus the master broker 140A may receive none, one, some, or all of the notifications 418, depending on whether the message stores 130A, 130B or 130C were able to successfully persist the enqueue event. Once the master broker 140A has received at least two notifications 418 the master broker 140A determines that the enqueue event is stabilized and so it stores 420 the enqueue event in its long term storage (i.e., persistent storage 142). Responsive to determining that the enqueue event is stabilized the master broker 140A sends a notification to the producer client 110 that the message is persisted 422.

The master broker 140A generates an assign event. The generated assign event includes metadata including the sequence number of the last stable message event (the enqueue event), the epoch number associated with the master broker who sent the last stable message event (master broker 140A), a sequence number for the assign event (e.g., sequence number 2), and the epoch number associated with the master broker 140A. The master broker 140A distributes 424 the assign event in parallel to the slave brokers 140B, 140C, and the messaging sources 130A, 130B, and 130C.

The master broker 140A holds 426 the assign event in memory. Once the slave brokers 140B, 140C receive the distributed assign event they update 428, 430 their respective broker states. Specifically, each slave broker 140B, 140C persists (e.g., move to persistent storage 142) the enqueue event that was being held in their respective memories, and then holds the assign event in their respective memories. Once a slave broker 140B, 140C persists the enqueue event, the slave broker 140B, 140C sends an acknowledgement 432 of the persisted event to all of the event stores 130A, 130B, 130C. The event stores 130A, 130B, 130C store the acknowledgments 432.

The event stores 130A, 130B, 130C receive the assign event, and store 434, 436, 438 the assign event in their respective permanent memories. Once an event store stores the assign event in permanent memory it sends notification 440 to the master broker 140A that the assign event has been persisted. Once the master broker 140A has received at least two notifications 440 the master broker 140A determines that the assign event is stabilized and so stores 442 assign event the assign event in its long term storage. In alternate embodiments, the master broker 140A may simply overwrite 442 the enqueue event in long term storage with the assign event.

Responsive to determining that the assign event is stabilized the master broker 140A sends 444 the message to a consumer client 120 (e.g., a backend server in an enterprise that is processing the orders that it receives from the master broker 140A). The consumer client 120 sends an acknowledgement 446 that it has received the message.

The master broker 140A generates a consume event. The generated consume event includes metadata including the sequence number (e.g., sequence number 2) of the last stable message event (the assign event), the epoch number associated with the master broker who sent the last stable message event (master broker 140A), a sequence number for the assign event (e.g., sequence number 3), and the epoch number associated with the master broker 140A. The master broker 140A distributes 448 the consume event in parallel to the slave brokers 140B, 140C, and the messaging sources 130A, 130B, and 130C.

The master broker 140A holds 450 the consume event in memory. Once the slave brokers 140B, 140C receive the distributed consume event they update 452, 454 their respective broker states. Specifically, each slave broker 140B, 140C persists the assign event that was being held in their respective memories, and then holds the consume event in their respective memories. In alternate embodiments, the slave brokers 140B, 140C may simply overwrite the enqueue event in long term storage with the assign event. Once a slave broker 140B, 140C persists the assign event, the slave broker 140B, 140C sends an acknowledgement 456 of the persisted event to all of the event stores 130A, 130B, 130C. The event stores 130A, 130B, 130C store the acknowledgments 356.

The event stores 130A, 130B, 130C receive the consume event, and store 458, 460, 462 the consume event in their respective permanent memories. Once an event store stores the consume event in permanent memory it sends notification 464 to the master broker 140A that the consume event has been persisted. Once the master broker 140A has received at least two notifications 464 the master broker 140A considers the consume event to be stabilized and stores 466 the consume event in its long term storage. In alternate embodiments, the master broker 140A may simply delete the consume event from memory and remove 466 the enqueue event and/or assign event from long term storage.

Note that at this point in the processing flow, the master has removed the stabilized consume message event, but the slave brokers 140B, 140C still are holding the consume message event in memory. In periods of high activity, the next message event generated by the master broker 140A and distributed to the slave brokers 140B, 140C would cause them to update their respective broker states. However, if there is a delay between message events, the master broker 140A may generate and distribute a stability event 468 to the slave brokers 140B, 140C, and the event stores 130A, 130B, 130C.

The stability message includes metadata including the sequence number (e.g., sequence number 3) of the last stable message event (the consume event), the epoch number associated with the master broker who sent the last stable message event (master broker 140A), a sequence number for the stability event (e.g., sequence number 4), and the epoch number associated with the master broker 140A. The master broker 140A distributes 468 the stability event in parallel to the slave brokers 140B, 140C, and the messaging sources 130A, 130B, and 130C.

Once the slave brokers 140B, 140C receive the distributed stability event they update their respective broker states. Specifically, each slave broker 140B, 140C persists the consume event that was being held in their respective memories. In alternate embodiments, the slave brokers 140B, 140C may simply remove the consume event from memory and remove the enqueue event and assign event from long term storage. The slave brokers 140B, 140C may also simply overwrite the enqueue event and/or assign event with the consume event. Once a slave broker 140B, 140C, persists 470, 472 the consume event, the slave broker 140B, 140C sends an acknowledgement 474 of the persisted event to all of the event stores 130A, 130B, 130C. The event stores 130A, 130B, 130C store the acknowledgments 474.

Figure 5:
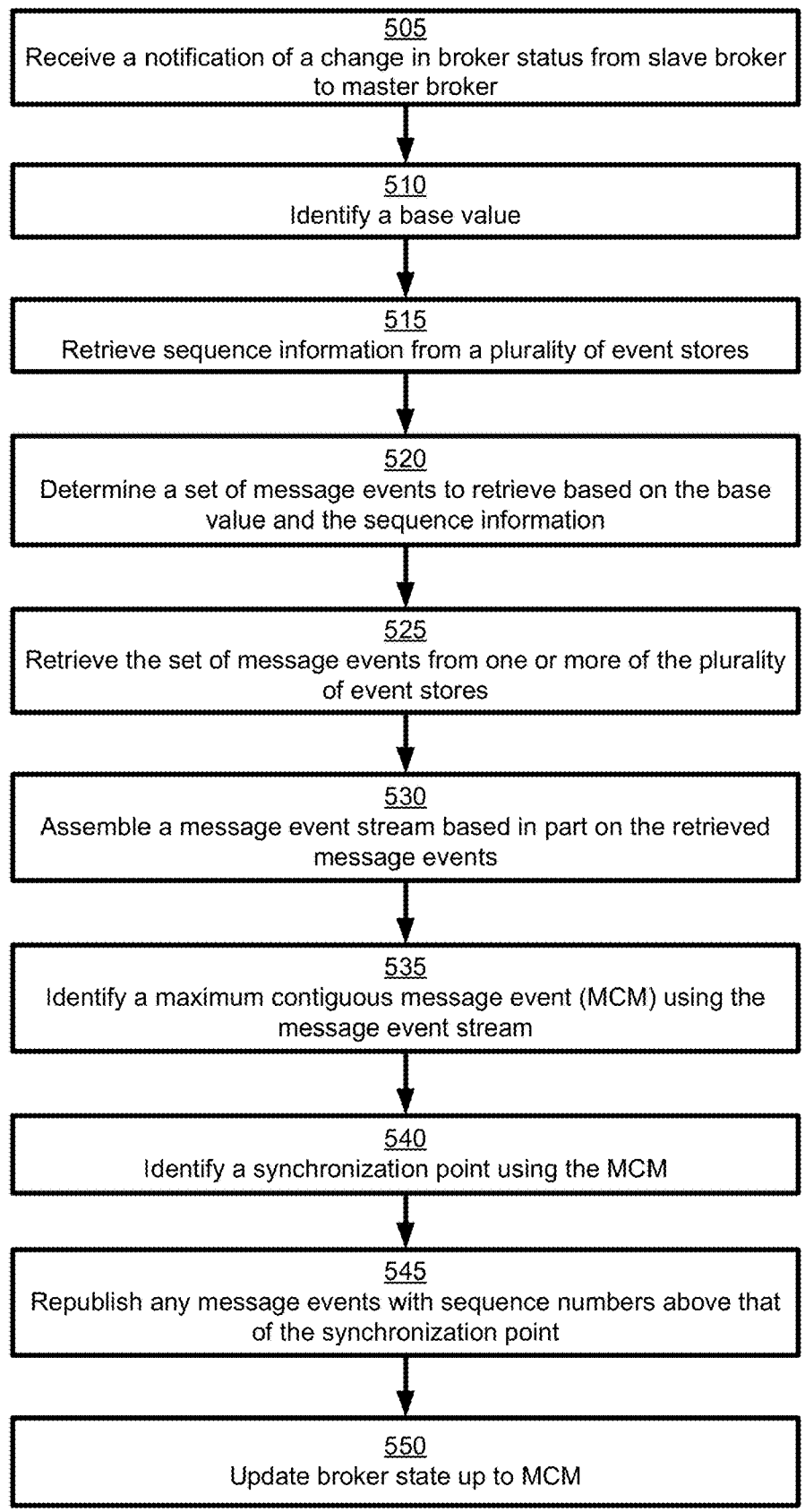
FIG. 5 is a flowchart illustrating a method for transitioning from a slave broker to a master broker, according to one embodiment.

FIG. 5 is a flowchart illustrating a method for transitioning from a slave broker to a master broker, according to one embodiment. In one embodiment, the process of FIG. 5 is performed by the broker 140. Other entities may perform some or all of the steps of the process in other embodiments. Likewise, embodiments may include different and/or additional steps, or perform the steps in different orders.

The broker 140 receives 505 a notification of a change in broker status from slave broker to master broker. For example, the previous master broker 140A may have failed, and after a specific time has passed since the last communication the slave brokers 140B, 140C elect using their respective master election modules 240 one of the slave brokers (e.g., 140B) to be the new master broker—referred to in this section as the broker 140. The epoch number is incremented to indicate that a new broker 140 epoch has been initiated.

The broker 140 identifies 510 a base value, the base value being a highest sequence number of a message event in persistent storage on the messaging broker. For example, sequence information may indicate that {509} is the highest value of a sequence number of a message that is in the persistent storage 142 of the broker 140.

The broker 140 retrieves 515 sequence information from a plurality of event stores 130A, 130B, 130C. Sequence information describes the highest sequence numbers of message events which has been persisted on each of the plurality of event stores 130A, 130B, 130C. For example, the highest sequence numbers may be values of {510, 512, 514} for event stores 130A, 130B, and 130C, respectively.

The broker 140 determines 520 a set of message events to retrieve based on the base value and the sequence information. Messages with sequence numbers below the base value are already tracked by the broker 140. If the base value equals the highest sequence number described in the sequence information, then the broker 140 is up to date. However, it is typically the case that before the old master broker 140A went offline there were some messages sent out which had yet to be stabilized. Accordingly, the broker state of the broker 140 is likely slightly behind the broker state of the old master broker 140A. By using the sequence information from the various message stores, the new elected broker 140 is able to recover the state of the older master broker 140A. Continuing the example above, the sequence information includes values of {510, 512, 514} for event stores 130A, 130B, and 130C, respectively, and the base value is {509}. Accordingly, the broker determines that it should retrieve message events {510-514} from one or more of the event stores 130A, 130B, and 130C, since this set of messages covers the entire set of messages from the base value message at sequence number {509} to the highest stabilized message at sequence number {514}. For example, Table 1 illustrates which message events that are stored in each of the respective event stores 130A, 130B, and 130C. The cell values in Table 1 indicate a sequence number and a back pointer associated with a message event, the back pointer being to the last stabilized message event. For example, "509(507)" represents a sequence number {507} and a back pointer to a sequence number {507} which is associated with the last stabilized message event when event stores 130A, 130B, and 130C stored the message event associated with sequence number 509.

TABLE 1

Example allocation of messages - no gap in sequence numbers.

| Event store | Sequence Number (Back pointer) | Sequence Number (Back pointer) | Sequence Number (Back pointer) | Sequence Number (Back pointer) | Sequence Number (Back pointer) | Sequence Number (Back pointer) |
|---|---|---|---|---|---|---|
| 130A | 509 (507) | 510 (508) | | | | |
| 130B | 509 (507) | 510 (508) | 511 (509) | 512 (510) | | |
| 130C | 509 (507) | 510 (508) | 511 (509) | 512 (510) | 513 (512) | 514 (512) |

The broker 140 retrieves 525 the set of message events from one or more of the plurality of event stores. In some embodiments, the broker 140 retrieves the set of message events in a round robin fashion, such that the broker 140 retrieves one message from a particular event store, the next message event from a different event store, and the next message event from a different event store, and so on, thus, reducing the load on any one store. The broker 140 does not request a message event from a message broker 130 if the requested message event has a sequence number higher than that of any of the message events stored on the event store. Continuing the example, above, the broker 140 would request message events {513} and {514} only from event store 130C, as event stores 130A and 130B only had message events up {510} and {511}, respectively, thus distributing the load among the event stores 130A, 130B, and 130C. In this example, the retrieved set of messages may include messages events with sequence numbers {511-514}. Note, the message event associated with sequence number 509 need not be requested as the base number is 509—accordingly broker state of the broker 140 is already updated to the messaging event associated with the sequence number 509. In alternate events, all the message events may be retrieved from a single store (e.g., message store 130C).

The broker 140 assembles 530 a message event stream based in part on the retrieved set of message events. The broker 140 creates the message event stream by ordering the message events in the received set by their respective sequence numbers. For example, a possible message event stream may be ordered {510, 511, 512, 513, 514}. The message events are ordered to identify any gaps in sequence numbers. Note that in some instances, there may be gaps in sequence numbers received from the multiple message stores 130A, 130B, 130C if one or more of the requested set of messages is missing. For example, a possible message event stream including a gap may be {510, 512, 513, 514}, which is missing messaging event {511}. A gap may occur if, for example, one or message stores fails to receive a message event from the master broker 140.

The broker 140 identifies 535 a maximum contiguous message event (MCM) using the message event stream. The MCM is a stabilized message event with the highest sequence number that the broker 140 can recover before encountering a gap in the sequence numbers. In cases where there is no gap, the MCM is simply the stabilized message event with the highest sequence number in the message event stream. For example, assuming there is no gap, the message event associated with sequence number {512} is the MCM as it is the message event with the highest sequence number that is also stabilized (stored on at least two event stores). Alternatively, if the message event stream included a gap—e.g., the same stream as depicted in Table 1—except that there are no entries for sequence number {511}, the MCM would be the message event associate with the sequence number {510} as it is the highest stabilized message before a gap occurs in the sequence numbers.

The broker 140 identifies 540 a synchronization point using the MCM. The MCM includes metadata that includes a back pointer to the last stable message (i.e., the sequence number of last stable message). The synchronization number of the messaging event pointed to by the back pointer of the MCM. Continuing with the above example where the MCM has a sequence number of {512}, the broker 140 would retrieve a back pointer in the metadata associated with that message that identifies the last stable message (e.g., the message event having a sequence number of {510}). Accordingly, the synchronization point would be the sequence number {510}.

The broker 140 republishes 545 any message events with sequence numbers above that of a synchronization point. The broker 140 republishes message events by re-generating the message events with sequence numbers above that of a synchronization point using a new epoch number and a new synchronization number, and then distributing the regenerated message events to all of the slave brokers and all of the event stores 130A, 130B, 130C. For example, assuming the synchronization point is the message with a sequence number of {503}, the broker 140 would republish message events with sequence numbers {504, 506, 507} to all of the event stores 130A, 130B, 130C and the remaining slave broker 140C. Slave brokers (e.g., 140C), responsive to receiving the republished message events with the different epoch number, discard all messages events post the synchronization point, and ignore any future messages from the prior master broker. In parallel, the broker 140 updates 550 its broker state up to the MCM. At this point, all of the brokers 140A, 140B, and 140C, and all of the message stores 130A, 130B, and 130 are fully synchronized. This was achieved even though there is no one shared central repository of messages.

Figure 6A:
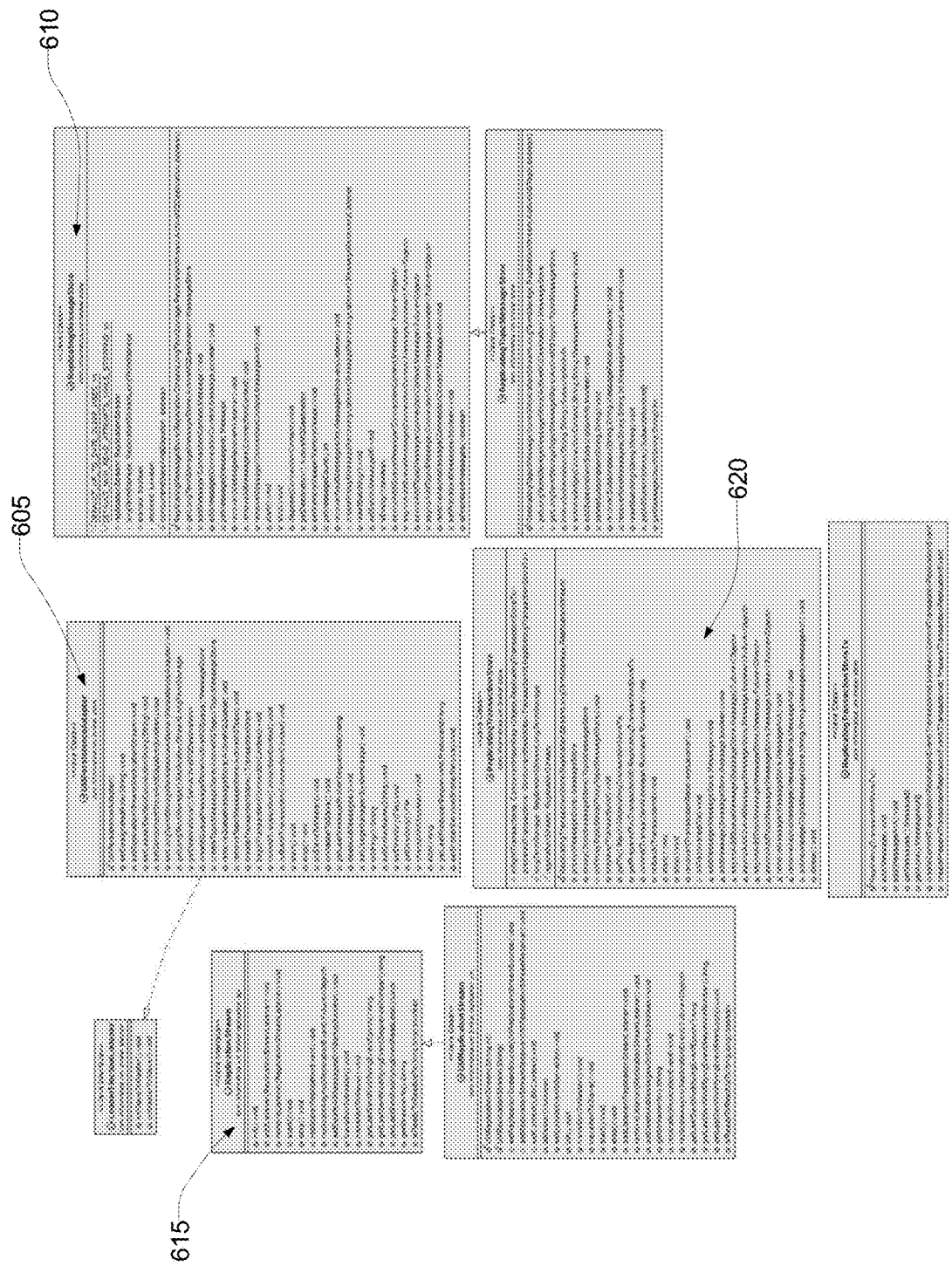
FIG. 6A is a class diagram of a replication stream and replication event store components of a message broker system to process a message, according to one embodiment.

FIG. 6A is a class diagram of a replication stream and replication event store components of a message broker system to process a message, according to one embodiment. The replication stream event store components include a UMPersistenceAdapter class 605, a ReplicatingMessageStore class 610, a ReplicationStream class 615 and a ReplicatingTransaction Store class 620. The UM PersistenceAdapter 605 implements ReplicatingMessageStore 610 and Replicating Transaction Store 620 to ensure that the persistent data messages that are being written to disk are first replicated using the UMP interface to support a master/slave message broker system without a centralized repository. An ActiveMQ broker will call the ReplicatingMessageStore's methods (i.e. addMessage, removeMessage, etc) as the producer or consumer clients interact with the master broker to send message events. The ReplicationStream class 615 methods are used by all the ReplicatingMessageStores 620 of the UM PersistenceAdapter 605. For example, the "addMessage" command from the broker will create an AddMessageReplicationEvent in the ReplicatingMessageStore 620 and the event is sent to the ReplicationStream 615 class's "replicate" method. The replicate method in the ReplicationStream 615 will distribute a message event from the source to the plurality of event stores and slave brokers in the system. Thus, the ReplicationStream class 615 is used to send/receive the replicated events that occur in a master broker.

The master broker performs various administrative events that are replicated to a slave through the standard event store interface (such as "create a new queue destination" or "remove an existing queue destination"). The decisions made by the master broker will be sequenced and replicated by the replication stream protocol.

Figure 6B:
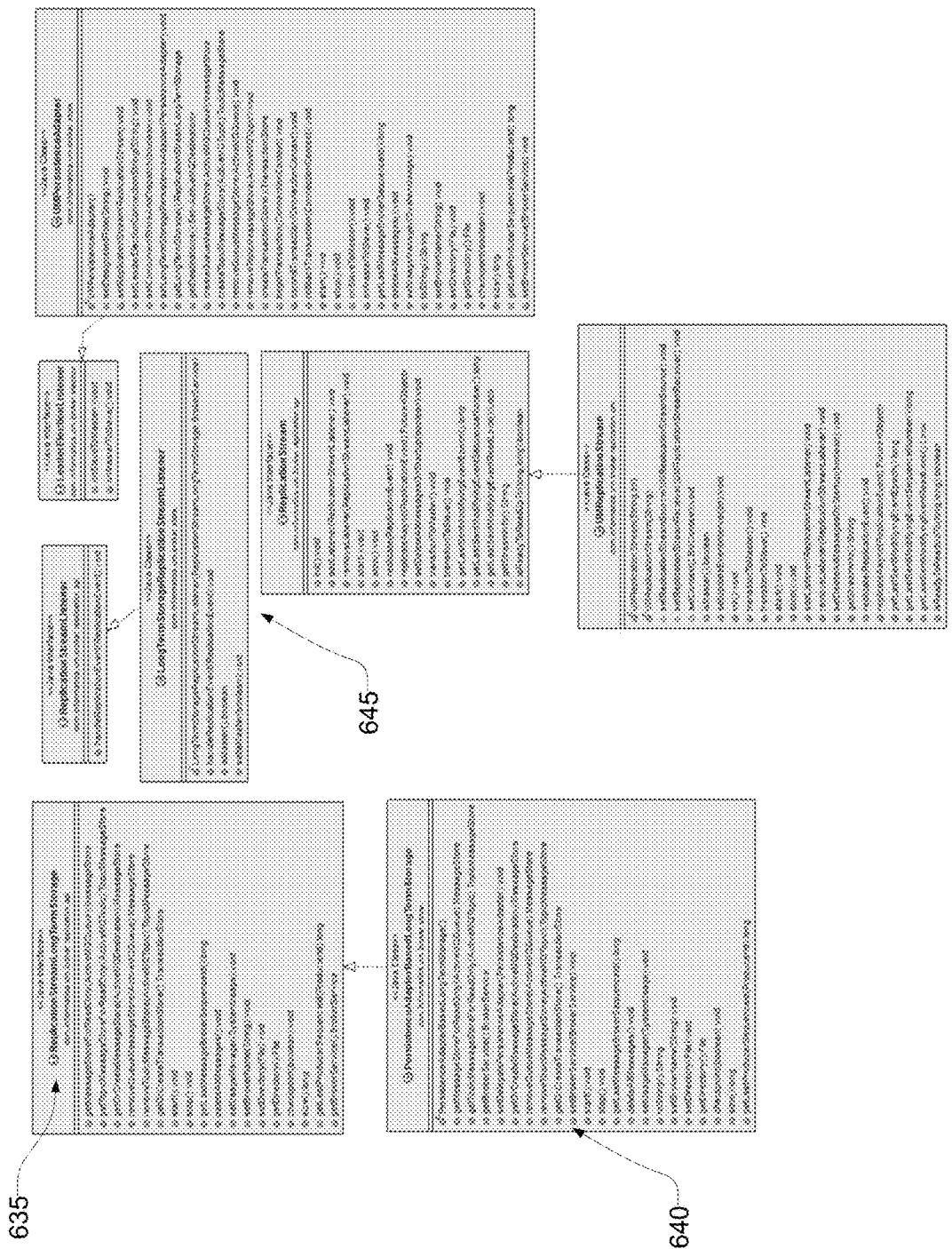
FIG. 6B is a class diagram of long term storage components of a message broker system to process a message, according to one embodiment.

The actual disk persistence occurs as a result of receiving the replication events from the ReplicationStream 615. A long term storage interface is implemented to allow for different implementations writing data to the disk. FIG. 6B illustrates an example class diagram of long term storage components of a message broker system to process a message, according to one embodiment. The long term storage components include a ReplicationStreamLongTermStorage class 635, a PersistenceAdapterBasedLongTermStorage class 640 and a LongTermStorageReplicationStreamListener 645 class. Once the replication event messages are sent to each slave broker, the receiver at the slave broker sends the message event to the ReplicationStreamListeners 645. One of the ReplicationStreamListener, i.e. the LongTermStorageReplicationStreamListener 645 will take each message event and pass it to the long term storage persistence adapter, i.e. PersistenceAdapterBasedLongTermStorage 640. The PersistenceAdapterBasedLongTermStorage 640 class will perform the actual persistence of the message event to the long term storage using the addMessage method.

Figure 6C:
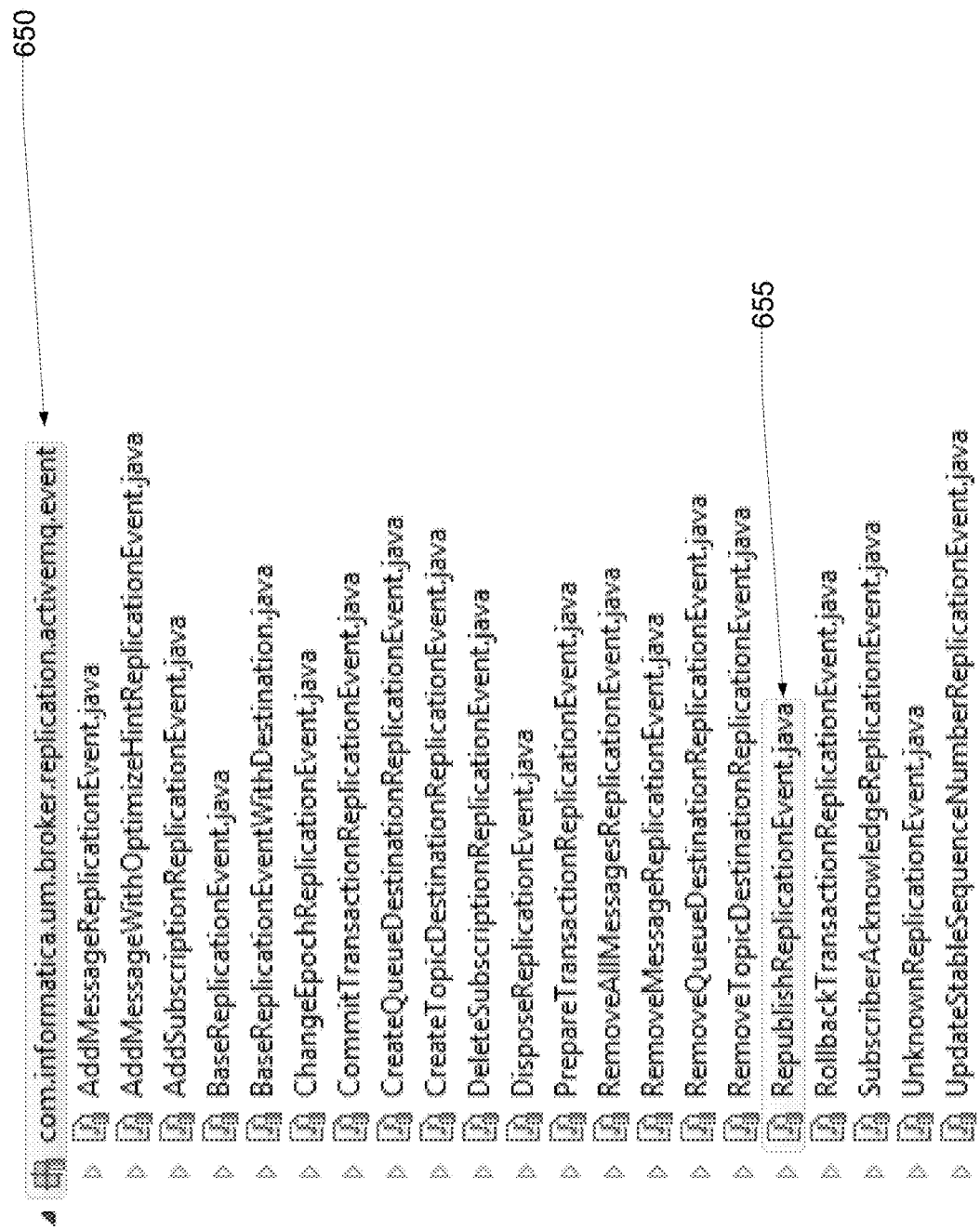
FIG. 6C is an interface between an event store and a message broker of a message broker system to process a message, according to one embodiment.

FIG. 6C is an example of an interface 650 between an event store and a message broker of a message broker system to process a message, according to one embodiment. The messaging queue replication interface, as illustrated in FIG. 6C, is used by the persistence adapter and other messaging and event store components to perform methods related to the replication stream protocol. For example, a RepublishReplicationEvent method 655 is used by the replication stream in the event of transitioning a slave broker to a master broker, to republish message events once a synchronization point is determined. Similarly other methods described in the replication interface are used by one of the messaging system components when performing the replication stream protocol.

Figure 7:
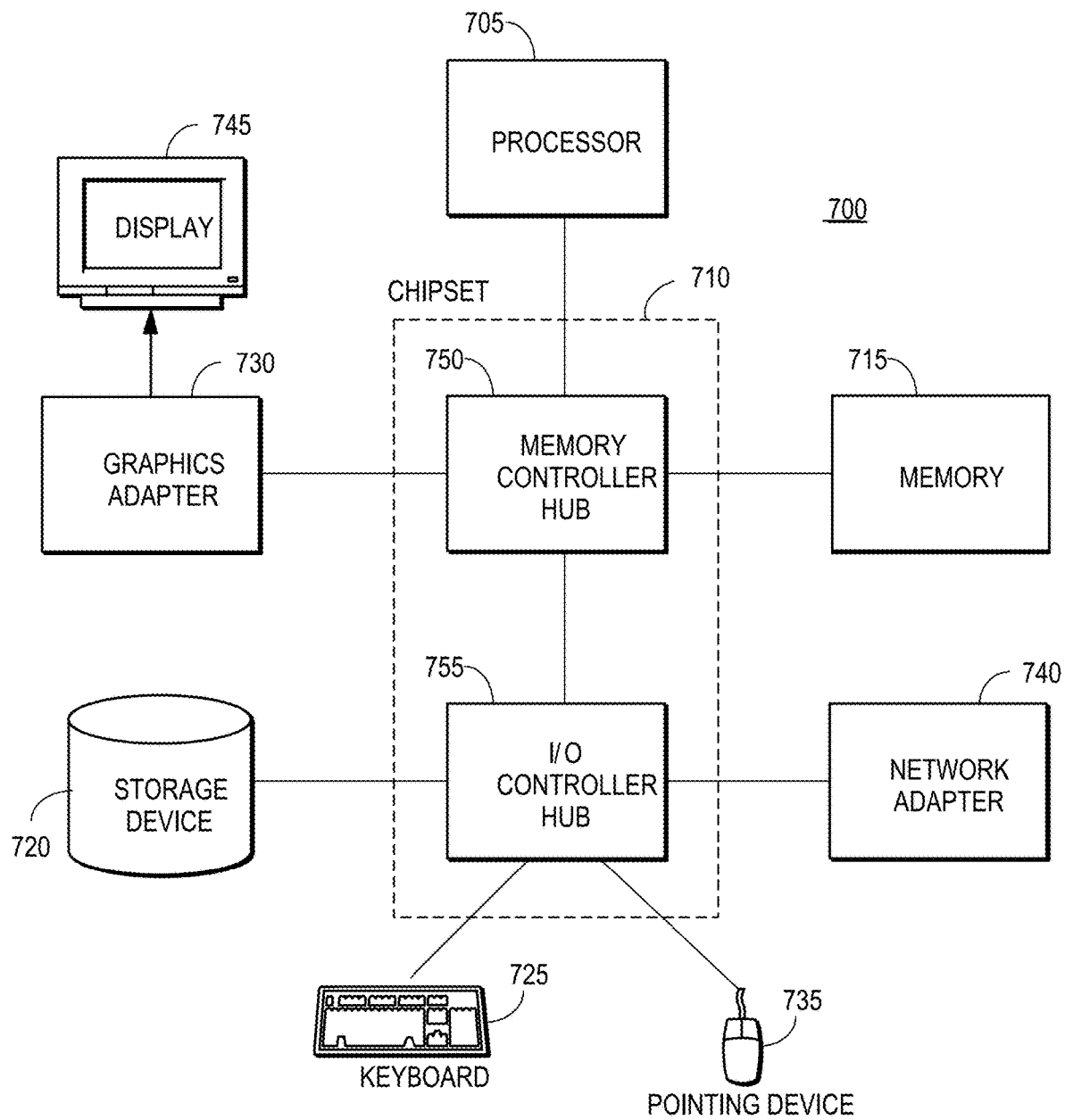
FIG. 7 is a high-level block diagram of the components of a computing system suitable for use in the networked environment depicted in FIG. 1, according to one embodiment.

FIG. 7 is a high-level block diagram illustrating an example computer 700 for implementing the entities shown in FIG. 1. Illustrated are at least one processor 705 coupled to a chipset 710. Also coupled to the chipset 710 are a memory 715, a storage device 720, a keyboard 725, a graphics adapter 730, a pointing device 735, and a network adapter 740. A display 745 is coupled to the graphics adapter 530. In one embodiment, the functionality of the chipset 710 is provided by a memory controller hub 750 and an I/O controller hub 755. In another embodiment, the memory 715 is coupled directly to the processor 705 instead of the chipset 710.

The storage device 720 is any non-transitory computer-readable storage medium, such as a hard drive, compact disk read-only memory (CD-ROM), DVD, or a solid-state memory device. The memory 715 holds instructions and data used by the processor 705. The pointing device 735 may be a mouse, track ball, or other type of pointing device, and is used in combination with the keyboard 725 to input data into the computer 700. The graphics adapter 730 displays images and other information on the display 745. The network adapter 740 couples the computer 700 to a network (e.g., the network 105 of FIG. 1).

As is known in the art, a computer 700 can have different and/or other components than those shown in FIG. 7. In addition, the computer 700 can lack certain illustrated components. For example, a computer 700 may lack a keyboard 725, pointing device 735, graphics adapter 730, and/or display 745. As another example, a computer 700 configured to display the stadium view visualization may be a tablet or smartphone with a touch screen interface and thus lack a keyboard 725 and pointing device 735. Moreover, the storage device 720 can be local and/or remote from the computer 700.

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 720, loaded into the memory 715, and executed by the processor 705.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for message brokering system. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein. The scope of the invention is to be limited only by the following claims.

The invention claimed is:

1. A method executed by a new master broker computer system for message synchronization, the method comprising:

storing, in persistent storage of the new master broker computer system, a plurality of message events, each message event comprising a message received from a client producer and uniquely identifying the message with an epoch value associated with a prior master broker computer system and a sequence number associated with the message event, the new master broker computer system previously being a slave broker computer system that changed its status based at least in part on failure of the previous master broker computer system;

identifying, by the new master broker computer system, a base value for the plurality of message events, the base value being a highest one of the sequence numbers of the message events stored by the new master broker computer system;

retrieving, by the new master broker computer system, a set of message events from one or more event stores in a plurality of event stores based at least in part on the base value and the highest sequence numbers of message events that have been persisted on each of the plurality of event stores;

generating, by the new master broker computer system, a message event stream based at least in part on the retrieved set of message events;

identifying, by the new master broker computer system, a maximum contiguous message event (MCM) based at least in part on the message event stream, wherein the MCM event is a message event with a highest sequence number prior to any sequence number gap in the message event stream; and synchronizing, by the new master broker computer system, a plurality of slave broker computer systems and the new master broker computer system to a state of the prior master broker system prior to failure based at least in part on the MCM event.

2. The method of claim 1, further comprising:
incrementing, by the new master broker computer system, a current epoch value to indicate that the new master broker computer system epoch has been initiated.

3. The method of claim 1, wherein failure of the previous master broker computer system is detected in response to one or more slave broker computer systems in the plurality of slave broker computer systems not receiving a message from the previous master broker computer system for a predetermined threshold of time.

4. The method of claim 1, wherein retrieving a set of message events from one or more event stores in a plurality of event stores based at least in part on the base value and the highest sequence numbers of message events that have been persisted on each of the plurality of event stores comprises:
retrieving, from the plurality of event stores, sequence information corresponding to the highest sequence numbers of message events that have been persisted on each of the plurality of event stores;
determining a set of message events to retrieve based at least in part on the base value and the sequence information; and
retrieving the set of message events from the one or more of the plurality of event stores.

5. The method of claim 1, wherein synchronizing a plurality of slave broker computer systems and the new master broker computer system to a state of the prior master broker system prior to failure based at least in part on the MCM event comprises:
identifying a synchronization point based at least in part on a back pointer of the MCM event, the back pointer pointing to a previous stabilized message event, wherein message events are stabilized based at least in part on storage in a quorum of event stores in the plurality of event stores; and
republishing any message events with sequence numbers above that of the synchronization point to each of the plurality of event stores and to the plurality of slave broker computer systems with a new epoch number determined for the new master broker computer system.

6. The method of claim 5, wherein republishing any message events with sequence numbers above that of the synchronization point further comprises:
regenerating the message events with sequence numbers above the synchronization point by using the new epoch number associated with the master broker computer system and a new synchronization number; and
distributing, in parallel, the regenerated message events to the plurality of slave broker computer systems and the plurality of event stores.

7. The method of claim 5, wherein synchronizing a plurality of slave broker computer systems and the new master broker computer system to a state of the prior master broker system prior to failure based at least in part on the MCM event further comprises:
updating the new master broker computer system by storing any message events with sequence numbers above that of the synchronization point in the persistent storage of the new master broker computer system.

8. A new master broker computer system for message synchronization comprising:
one or more processors; and
one or more memories operatively coupled to at least one of the one or more processors and having instructions stored thereon that, when executed by at least one of the one or more processors, cause at least one of the one or more processors to:
store, in persistent storage of the new master broker computer system, a plurality of message events, each message event comprising a message received from a client producer and uniquely identifying the message with an epoch value associated with a prior master broker computer system and a sequence number associated with the message event, the new master broker computer system previously being a slave broker computer system that changed its status based at least in part on failure of the previous master broker computer system;
identify a base value for the plurality of message events, the base value being a highest one of the sequence numbers of the message events stored by the new master broker computer system;
retrieve a set of message events from one or more event stores in a plurality of event stores based at least in part on the base value and the highest sequence numbers of message events that have been persisted on each of the plurality of event stores;
generate a message event stream based at least in part on the retrieved set of message events;
identify a maximum contiguous message event (MCM) based at least in part on the message event stream, wherein the MCM event is a message event with a highest sequence number prior to any sequence number gap in the message event stream; and
synchronize a plurality of slave broker computer systems and the new master broker computer system to a state of the prior master broker system prior to failure based at least in part on the MCM event.

9. The new master broker of claim 8, wherein at least one of the one or more memories has further instructions stored thereon that, when executed by at least one of the one or more processors, cause at least one of the one or more processors to:

increment a current epoch value to indicate that the new master broker computer system epoch has been initiated.

10. The new master broker of claim 8, wherein failure of the previous master broker computer system is detected in response to one or more slave broker computer systems in the plurality of slave broker computer systems not receiving a message from the previous master broker computer system for a predetermined threshold of time.

11. The new master broker of claim 8, wherein the instructions that, when executed by at least one of the one or more processors, cause at least one of the one or more processors to retrieve a set of message events from one or more event stores in a plurality of event stores based at least in part on the base value and the highest sequence numbers of message events that have been persisted on each of the plurality of event stores further cause at least one of the one or more processors to:

retrieve, from the plurality of event stores, sequence information corresponding to the highest sequence numbers of message events that have been persisted on each of the plurality of event stores;

determine a set of message events to retrieve based at least in part on the base value and the sequence information; and retrieve the set of message events from the one or more of the plurality of event stores.

12. The new master broker of claim 8, wherein the instructions that, when executed by at least one of the one or more processors, cause at least one of the one or more processors to synchronize a plurality of slave broker computer systems and the new master broker computer system to a state of the prior master broker system prior to failure based at least in part on the MCM event further cause at least one of the one or more processors to:

identify a synchronization point based at least in part on a back pointer of the MCM event, the back pointer pointing to a previous stabilized message event, wherein message events are stabilized based at least in part on storage in a quorum of event stores in the plurality of event stores; and republish any message events with sequence numbers above that of the synchronization point to each of the plurality of event stores and to the plurality of slave broker computer systems with a new epoch number determined for the new master broker computer system.

13. The new master broker of claim 12, wherein the instructions that, when executed by at least one of the one or more processors, cause at least one of the one or more processors to republish any message events with sequence numbers above that of the synchronization point further cause at least one of the one or more processors to:

regenerate the message events with sequence numbers above the synchronization point by using the new epoch number associated with the master broker computer system and a new synchronization number; and distribute, in parallel, the regenerated message events to the plurality of slave broker computer systems and the plurality of event stores.

14. The new master broker of claim 12, wherein the instructions that, when executed by at least one of the one or more processors, cause at least one of the one or more processors to synchronize a plurality of slave broker computer systems and the new master broker computer system to a state of the prior master broker system prior to failure based at least in part on the MCM event further cause at least one of the one or more processors to:

update the new master broker computer system by storing any message events with sequence numbers above that of the synchronization point in the persistent storage of the new master broker computer system.

15. At least one non-transitory computer-readable medium storing computer-readable instructions that, when executed by a new master broker computer system, causes the new master broker computer system to:

store, in persistent storage of the new master broker computer system, a plurality of message events, each message event comprising a message received from a client producer and uniquely identifying the message with an epoch value associated with a prior master broker computer system and a sequence number associated with the message event, the new master broker computer system previously being a slave broker computer system that changed its status based at least in part on failure of the previous master broker computer system;

identify a base value for the plurality of message events, the base value being a highest one of the sequence numbers of the message events stored by the new master broker computer system;

retrieve a set of message events from one or more event stores in a plurality of event stores based at least in part on the base value and the highest sequence numbers of message events that have been persisted on each of the plurality of event stores;

generate a message event stream based at least in part on the retrieved set of message events;

identify a maximum contiguous message event (MCM) based at least in part on the message event stream, wherein the MCM event is a message event with a highest sequence number prior to any sequence number gap in the message event stream; and synchronize a plurality of slave broker computer systems and the new master broker computer system to a state of the prior master broker system prior to failure based at least in part on the MCM event.

16. The at least one non-transitory computer-readable medium of claim 15, further storing computer-readable instructions that, when executed by at least one of the one or more computing devices, cause at least one of the one or more computing devices to:

increment a current epoch value to indicate that the new master broker computer system epoch has been initiated.

17. The at least one non-transitory computer-readable medium of claim 15, wherein failure of the previous master broker computer system is detected in response to one or more slave broker computer systems in the plurality of slave broker computer systems not receiving a message from the previous master broker computer system for a predetermined threshold of time.

18. The at least one non-transitory computer-readable medium of claim 15, wherein the instructions that, when executed by at least one of the one or more computing devices, cause at least one of the one or more computing devices to retrieve a set of message events from one or more event stores in a plurality of event stores based at least in part on the base value and the highest sequence numbers of message events that have been persisted on each of the plurality of event stores further cause at least one of the one or more computing devices to:
- retrieve, from the plurality of event stores, sequence information corresponding to the highest sequence numbers of message events that have been persisted on each of the plurality of event stores;
- determine a set of message events to retrieve based at least in part on the base value and the sequence information; and
- retrieve the set of message events from the one or more of the plurality of event stores.

19. The at least one non-transitory computer-readable medium of claim 15, wherein the instructions that, when executed by at least one of the one or more computing devices, cause at least one of the one or more computing devices to synchronize a plurality of slave broker computer systems and the new master broker computer system to a state of the prior master broker system prior to failure based at least in part on the MCM event further cause at least one of the one or more computing devices to:
- identify a synchronization point based at least in part on a back pointer of the MCM event, the back pointer pointing to a previous stabilized message event, wherein message events are stabilized based at least in part on storage in a quorum of event stores in the plurality of event stores; and
- republish any message events with sequence numbers above that of the synchronization point to each of the plurality of event stores and to the plurality of slave broker computer systems with a new epoch number determined for the new master broker computer system.

20. The at least one non-transitory computer-readable medium of claim 19, wherein the instructions that, when executed by at least one of the one or more computing devices, cause at least one of the one or more computing devices to republish any message events with sequence numbers above that of the synchronization point further cause at least one of the one or more computing devices to:
- regenerate the message events with sequence numbers above the synchronization point by using the new epoch number associated with the master broker computer system and a new synchronization number; and
- distribute, in parallel, the regenerated message events to the plurality of slave broker computer systems and the plurality of event stores.

21. The at least one non-transitory computer-readable medium of claim 19, wherein the instructions that, when executed by at least one of the one or more computing devices, cause at least one of the one or more computing devices to synchronize a plurality of slave broker computer systems and the new master broker computer system to a state of the prior master broker system prior to failure based at least in part on the MCM event further cause at least one of the one or more computing devices to:
- update the new master broker computer system by storing any message events with sequence numbers above that of the synchronization point in the persistent storage of the new master broker computer system.

* * * * *